United States Patent
Jacobs et al.

(10) Patent No.: US 8,209,429 B2
(45) Date of Patent: Jun. 26, 2012

(54) VIDEO STREAM SWITCHING

(75) Inventors: Richard J Jacobs, Woodbridge (GB);
Matthew D Walker, Felixstowe (GB);
Dimitrios Miras, Amata (GR)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1113 days.

(21) Appl. No.: 10/482,940

(22) PCT Filed: Jul. 19, 2002

(86) PCT No.: PCT/GB02/03307
§ 371 (c)(1),
(2), (4) Date: Jan. 6, 2004

(87) PCT Pub. No.: WO03/009581
PCT Pub. Date: Jan. 30, 2003

(65) Prior Publication Data
US 2004/0172478 A1    Sep. 2, 2004

(30) Foreign Application Priority Data
Jul. 19, 2001    (EP) .................................... 01306206

(51) Int. Cl.
*G06F 15/16* (2006.01)
(52) U.S. Cl. ........ 709/231; 709/230; 709/232; 709/233; 709/240; 709/219; 348/219.1; 348/E5.008; 375/240.03
(58) Field of Classification Search .......... 709/230–233, 709/219, 240; 348/219.1, E5.008; 375/240.03
See application file for complete search history.

(56) References Cited

U.S. PATENT DOCUMENTS

| | | | | |
|---|---|---|---|---|
| 5,812,786 | A * | 9/1998 | Seazholtz et al. | 709/233 |
| 5,990,945 | A * | 11/1999 | Sinha et al. | 348/219.1 |
| 6,014,694 | A * | 1/2000 | Aharoni et al. | 709/219 |
| 6,038,000 | A * | 3/2000 | Hurst, Jr. | 375/240.26 |
| 6,970,935 | B1 * | 11/2005 | Maes | 709/230 |
| 7,093,028 | B1 * | 8/2006 | Shao et al. | 709/240 |
| 2003/0061368 | A1 * | 3/2003 | Chaddha | 709/231 |

(Continued)

FOREIGN PATENT DOCUMENTS

EP    1079631 A1    2/2001

OTHER PUBLICATIONS

Shao, et al., "Scalable object-based video multicasting over the Internet", Proc. of Int. Conf. of Image Processing 2000, Sep. 10, 2000, vol. 3, pp. 552-555.*

(Continued)

*Primary Examiner* — Ario Etienne
*Assistant Examiner* — Michael C Lai
(74) *Attorney, Agent, or Firm* — Nixon & Vanderhye P.C.

(57) ABSTRACT

A client on a packet based network is provided with a stream of encoded video data. The system is maximizes the bit-rate of the video stream by adapting to fluctuations in network capacity. Adaptation of the bit-rate of the transmitted enclosed video data is timed to occur upon a scene change in the video sequence. In this way the interruption to the viewer when the perceived quality of the video sequence increases or decreases is minimized as it is 'hidden' in the scene change. The technique may be applied to hierarchically encoded video data and to other encoding technique which adapt to network conditions.

17 Claims, 3 Drawing Sheets

U.S. PATENT DOCUMENTS

2004/0114684 A1* 6/2004 Karczewicz et al. .... 375/240.03

OTHER PUBLICATIONS

Lakshman, et al, "VBR video: tradeoffs and potentials", Proc. of IEEE, May 1998, vol. 86, No. 5, pp. 952-973.*

Anonymous: "Method to Deliver Scalable Video Across a Distributed Computer System", IBM Technical Disclosure Bulletin, IBM Corp. New York, US, vol. 5, No. 37, May 1, 1994, pp. 251-256, XP002079392.

Rejaic et al, "Architectural considerations for Playback of Quality Adaptive Video over the Internet", IEEE International Conference on Networks, Icon, Proceedings of Icon, XX, XX, Sep. 5, 2000, pp. 204-209.

Realnetworks et al, "RealSystem Release 8 with RealProducer 8.5", Realnetworks, Dec. 12, 2000, XP002177091.

Feng et al, "Scene Change Detection Algorithm for MPEG Video Sequence", pp. 821-824, 1996 IEEE.

Liu et al, "Automatic Determination of Scene Changes in MPEG Compressed Video", p. 764-767, 1995 IEEE.

Boreczky et al, "Comparison of Video Shot Boundary Detection Techniques".

Lakshman, et al., "VBR Video: Tradeoffs and Potentials," Proceedings of the IEEE, vol. 86, No. 5, pp. 952-973 (May 1998).

Shao, et al., "Scalable Object-Based Video Multicasting Over the Internet," International Conference on Image Processing 2000, vol. 3, pp. 552-555 (Sep. 10, 2000).

Lakshman, T.V., et al., "VBR Video: Tradeoffs and Potentials", Proceedings of the IEEE, vol. 86, No. 5, May 1998, pp. 952-973, ISSN: 0018-9219.

Shao, Huai-Rong, et al., "Scalable Object-Based Video Multicasting Over the Internet," International Conference on Image Processing, 2000, vol. 3, on pp. 552-555 vol. 3, Meeting Date: Sep. 10, 2000-Sep. 13, 2000, Vancouver, BC, Canada, ISBN: 0-7803-6297-7.

First Office Action dated Jan. 29, 2008 in KR Patent Application No. 7000887/2004 with English translation.

Final Rejection dated Jul. 24, 2008 in KR Patent Application No. 7000887/2004 with English translation.

Decision of Grant dated Jan. 23, 2009 in KR Patent Application No. 7000887/2004 with English translation.

Office action mailed Oct. 21, 2008 in JP 2003-514793 with English translation.

* cited by examiner

VIDEO STREAM SWITCHING

This application is the U.S. national phase of international application PCT/GB02/03307 filed 19 Jul. 2002 which designated the U.S. and claims benefit of EP 01306206.3, dated Jul. 19, 2001, the entire content of which is hereby incorporated by reference.

BACKGROUND

1. Technical Field

The invention is in the field of video streaming over packet networks and in particular concerns the adaptive transmission of data in response to network congestion.

2. Related Art

In recent years, the Internet has experienced a proliferation in transmission of real-time multimedia, mainly in the form of streamed audio-visual content, either delivered live or from pre-recorded sources. Furthermore, traditional forms of multimedia such as streaming and conferencing are being followed by applications with richer content such as Internet multi-channel TV and complex immersive environments. This increase in traffic will put strains on the network and it is therefore desirable that application programs are designed to respond to congestion if stability of the network is to be maintained. It is desirable that network conditions are monitored and output bit-rates adjusted to the available bandwidth.

There is a more immediate advantage to the user in having an adaptive output bit-rate which is that the highest possible transmission bit-rate that the network will allow is used and therefore the user will always receive the best possible image quality. There are a number of known approaches to adaptive quality video streaming, one of which is hierarchical coding. In this technique the original video data is encoded into a number of discreet streams called layers, where the first layer consists of basic data of a relatively poor quality and where successive layers represent more detailed information so that layers can be added to increase the image quality or layers can be taken away, depending on the available bandwidth.

As the bit-rate available to a session is subject to significant variations in the number of layers that are transmitted, quality fluctuations occur in the decoded image as layers are added or dropped. When layers are added or dropped frequently the fluctuations in quality may become disturbing to a viewer.

BRIEF SUMMARY

In a first embodiment of the present invention there is provided a method of operating a multimedia server, said method comprising:
  providing a stream of video data representing a video sequence to an output of the multimedia server, wherein the output of the media server is connected to a packet based network,
  measuring a property of the video data in order to determine the occurrence of a scene change in the video sequence,
  detecting the available bandwidth on the network,
  varying the bit-rate of the stream of video data,
  wherein the method is characterised in that
  variation in the bit-rate of the video data is controlled to occur in response to variations in the capacity of the network (203) and preferentially with a scene change in the video sequence.

The term preferentially used herein is meant to indicate that in certain circumstances (discussed in greater detail below) it may not be practical to wait for a change of scene to occur in the video sequence before varying the bit-rate of the video stream, and in such circumstances the bit-rate will be changed at points in the video stream which do not correspond to a change of scene.

The term scene change (or change of scene) is intended to refer to a sudden change in a video sequence within the space of a one or a very few frames such as typically occurs at a change of scene, whether or not there has been an actual change of scene.

BRIEF DESCRIPTION OF THE DRAWINGS

Embodiments of the present invention will now be described, by way of example only, with reference to the following figures, where.

DETAILED DESCRIPTION OF EXEMPLARY EMBODIMENTS

Figure 1:
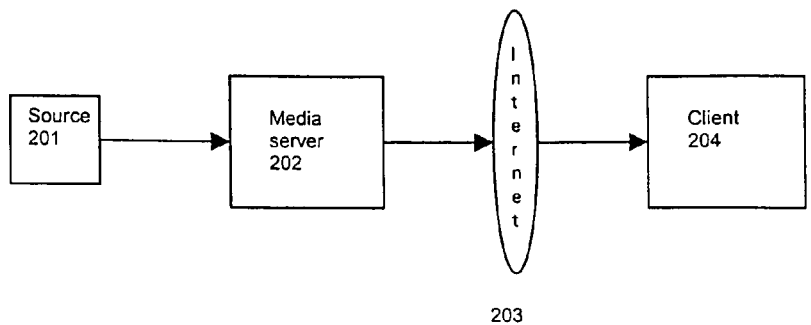
FIG. 1 is a schematic diagram of the content-based inter-stream session bandwidth sharing architecture.

The client/server arrangement for a known hierarchical streaming technology is shown in FIG. 1. A media server 202 is provided which has access to compressed audiovisual data 201, which may be fed 'live' from an outside broadcast or may be pre-compressed and stored in a database. The data source 201 may be on the same premises as the media server 202 and linked via an intranet. The media server 202 runs on a suitable server computer and which has access to the Internet 203.

A video viewer, hitherto referred to as the client 204, running on a PC suitably configured to have access to the Internet 203, may connect to the media server 202 via the Internet 203 and thus the client 204 is able to access content. A suitable PC terminal is used.

Figure 2:
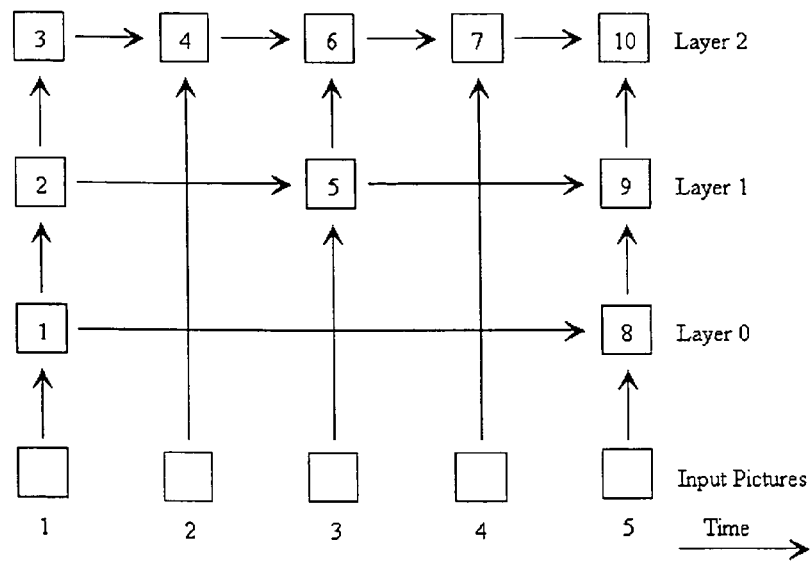
FIG. 2 shows the order of packets in a layered coding system.

Layered video compression is achieved with the 1998 version of H.263 but equally may be any other codec, such as MPEG4. Each layer in the hierarchy is coded in such a way as to allow the quality of individual pictures to be enhanced and their resolution to be increased, and additional pictures to be included to increase the overall picture rate, as explained with reference to FIG. 2. FIG. 2 illustrates a typical dependency between pictures in an H.263 scalable layered coder, with the boxes representing the frames for each layer and arrows showing the dependency between frames. The lowest row shows original, un-coded frames. The next row shows the lowest layer (Layer 0) of the hierarchy which is coded at half the frame rate of Layer 1. Frames in Layer 0 are predicted from the previously encoded frame, as in conventional video compression. Frames in Layer 1 may be predicted from the previously encoded frame in Layer 1 and, if present, the temporally simultaneous Layer 0 encoded frame. Frames in Layer 2 may be predicted from the previously encoded frame in Layer 2 and, if present, the temporally simultaneous Layer 1 or Layer 0 encoded frame. The H.263 specification allows for 15 layers; in the present embodiment server and client software is not limited in the number of layers that can be used, but in this case a database has been generated with video streams containing four layers.

Figure 3:
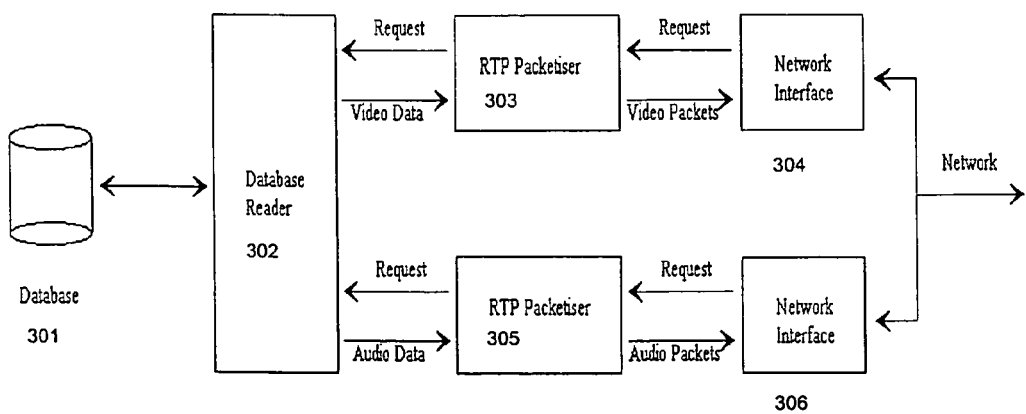
FIG. 3 is a diagram of a media server.

FIG. 3 shows the architecture of media server 201. In the present embodiment the audiovisual source is a database 301 of compressed video data and the media server 201 is responsible for reading the compressed data from a database, packetising and distributing it. The data is distributed according to the Real-time Transport Protocol (RTP) which provides end-to-end network transport functions suitable for applications transmitting real-time data such as audio, video or simulation data. RTP does not address resource reservation and does not guarantee quality-of-service for real-time services. The data transport is augmented by a control protocol (RTCP) to allow monitoring of the data delivery and to provide minimal control and identification functionality. RTP and RTCP are designed to be independent of the underlying transport and network layers. The media server 201 has four major components: database reader 302, video RTP packetiser 303, audio RTP packetiser 305 and a network interface 304. Video and audio data are stored as files of compressed bits in the database 301. The database reader 302 retrieves and synchronises the compressed audio and video from the database 301.

The audio and video data is then sent to a RTP packetiser 303,305. Audio and video information is transmitted over the IP network using the User Datagram Protocol (UDP) and Real-time Transport Protocol (RTP) packetisation. UDP provides a checksum to detect transmission errors, but does not guarantee data delivery: packets may be lost, duplicated or re-ordered. RTP provides end-to-end delivery services, such as payload type identification, sequence numbering, time-stamping and delivery monitoring. RTP packetisers 303,305 attach the RTP Header and, in the case of video packets, the H.263 Payload Header which provides some protection from packet loss. The Payload Header contains information specific to the video stream, such as motion vector predictors, which is obtained by decoding the compressed bit stream.

Figure 4:
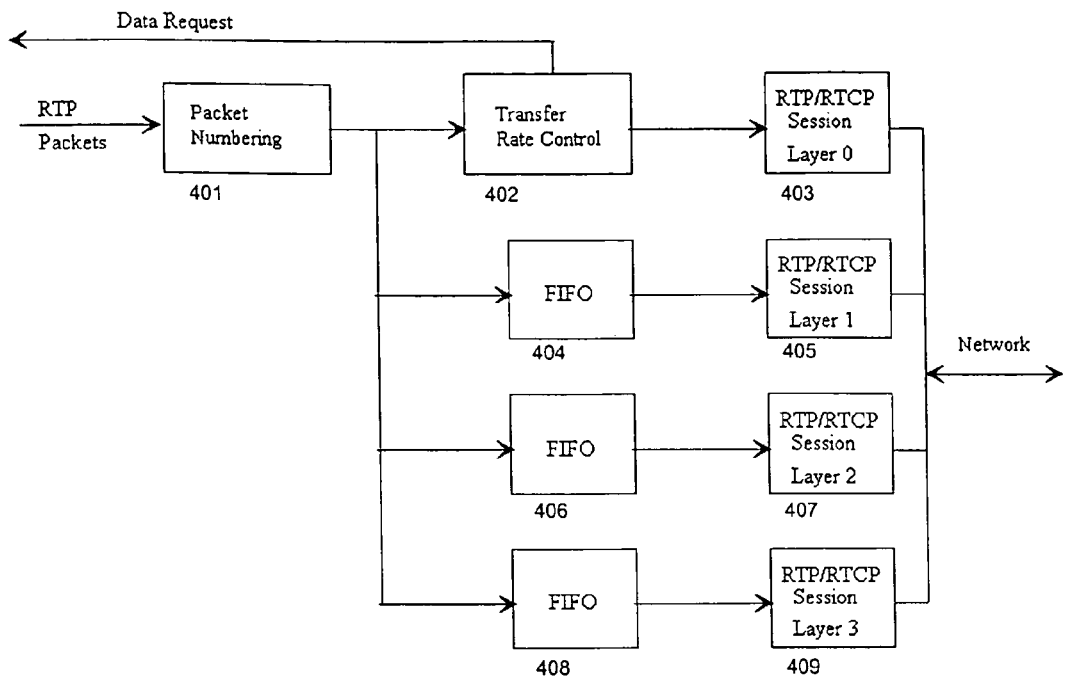
FIG. 4 is a diagram of the network interface of the media server shown in FIG. 3.

The rate at which data is read from the database 301 is controlled from the network interface 304, which is illustrated in greater detail in FIG. 4. With reference to FIG. 4 the arrangement of the network interface 304 for the video data will now be described. A packet numbering module 401 assigns a number to each packet of data. These packet numbers are used by the client to assemble packets into the sequence required for decoding. The number of bits produced by compressing a picture is in general not constant, even when the transmission rate is constant. The first picture of a new scene will usually produce a larger number of bits than a picture where there is little movement or detail. The encoding process will use a control strategy together with an output data buffer to smooth these variations in preparation for transmission at a constant bit rate. In the case of layered coding, each layer has its own control strategy and buffer as it has its own constant bit rate constraint to meet. The delay across each of these buffers will not be constant and will not be the same for each layer. Delay variation between the layers is therefore introduced at the source of the data. Transmission across a network may cause this delay variation to increase. A packet numbering scheme is therefore needed to ensure that a client can arrange the packets it receives into the order required for decoding. This scheme is required to handle the cases of the client not receiving all of the layers and of packet loss in the layers that it does receive. Each layer is transmitted as an independent RTP Session on a separate IP address by a session handler 403, 405, 407, 409. The rate at which data is transmitted is controlled by the Transfer Rate Control module 402, which counts Layer 0 bytes to ensure that the correct number are transmitted in a given period of time. The transmission rate of the other layers is smoothed and locked to the rate of Layer 0 using First-In First-Out (FIFO) buffer elements 404, 406, 408.

Figure 5:
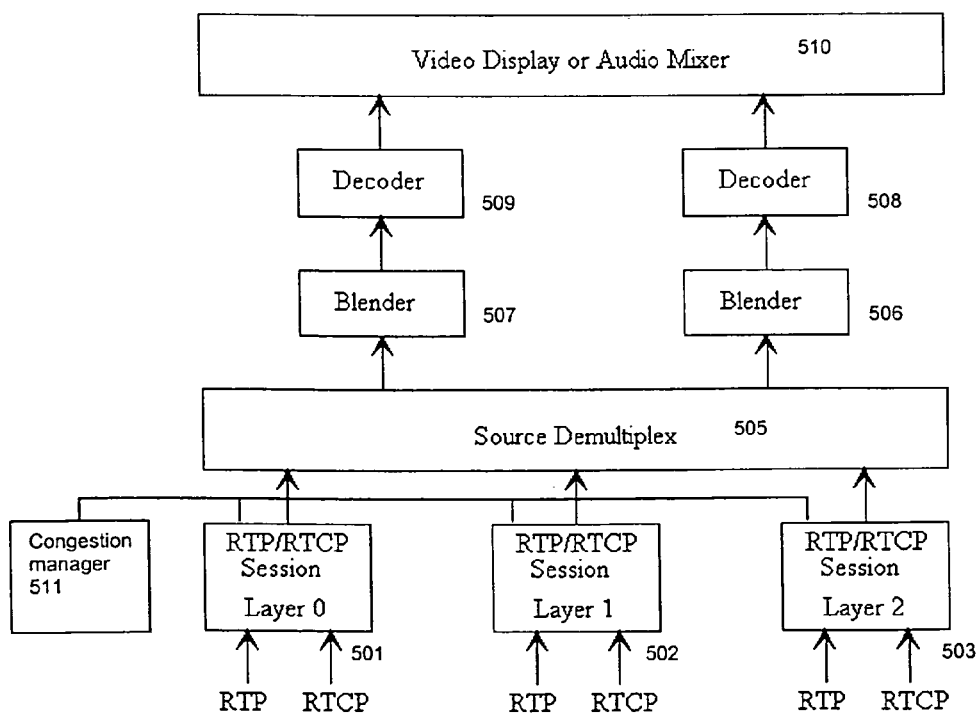
FIG. 5 is a diagram of a client.

The client 204 of the known hierarchical streaming technology will now be described with reference to FIG. 5. Each RTP/RTCP Session associated with each layer of encoded data has a session handler 501, 502, 503, 504 at the client which is responsible for receiving RTP packets from the network. The packets are then passed to a source demultiplex module 505. This receives packets from all layers and all sources, demultiplexes them by source, and routes them to a blender module 506, 507 for that source. The blender module 506, 507 receives packets from all layers from one source in the order that they were received from the network. This may not be the order required for decoding because of packet inter-arrival jitter or packet loss. The blender module 506, 507 uses the packet numbers in the RTP headers to arrange the packets from each layer in order and then combines the packets from all layers together. The output of the blender module 506, 507 is a single stream of packets which are in the correct order for decoding. This is the same order as they come out of the packet numbering module 401 of the media server 202.

Packets are then sent to the decoder 508, 509 where the packets are decoded into 20 ms blocks of audio samples or to video pictures. In the case of pictures, these are rendered to a window on the display 508.

Also provided is a congestion manager 511 to which the session handlers 501-504 report packet loss. If packets are being consistently lost, indicating network congestion, the congestion manager 511 will instruct the session handler responsible for the highest layer of compressed data to terminate the RTP/RTCP Session. Periodically the congestion manager 511 will instruct an experimental joining of a layer via the appropriate session handler to test whether there is available bandwidth in the network. If this experiment is successful, i.e. that substantially all of the packets of each layer are getting reaching the client, then the new layer will be adopted. In this way the maximum available bandwidth is employed.

It possible for the congestion manager 509 to instruct layers to be dropped and restored rapidly as the network bandwidth fluctuates. This could be annoying for a viewer and so a way of 'hiding' the shift is employed. The layered encoding method described above is adapted so that if a layer is to be dropped or added, the changeover preferentially occurs during a scene-change in the video data. A video scene is typically perceived as the number of consecutive frames within a video sequence that do not show significant changes in the video content. Within a video scene or shot, the camera action may be fixed or may exhibit a number of relatively uniform changes like panning, zooming, tracking etc. Scene changes may be recognised as abrupt transitions of the camera action or gradual transitions. In order to identify the scenes within a video sequence the assumption is that the levels of motion energy as well as those of luminance and colour do not change much between successive frames within a single scene. Techniques of scene boundary identification include pixel differencing, motion vector and block matching techniques. A very sudden change in the content of temporally adjacent frames will thus appear as a change of scene; clearly it is conceivable that such a change might not actually relate to a scene change at all, but, for example, may instead be the consequence of a large foreground object coming rapidly into view. However, such an abrupt change will nonetheless be a good place to add or remove a session layer and thus the term scene change is meant to cover such large changes in frame content from one frame to another.

Figure 6:
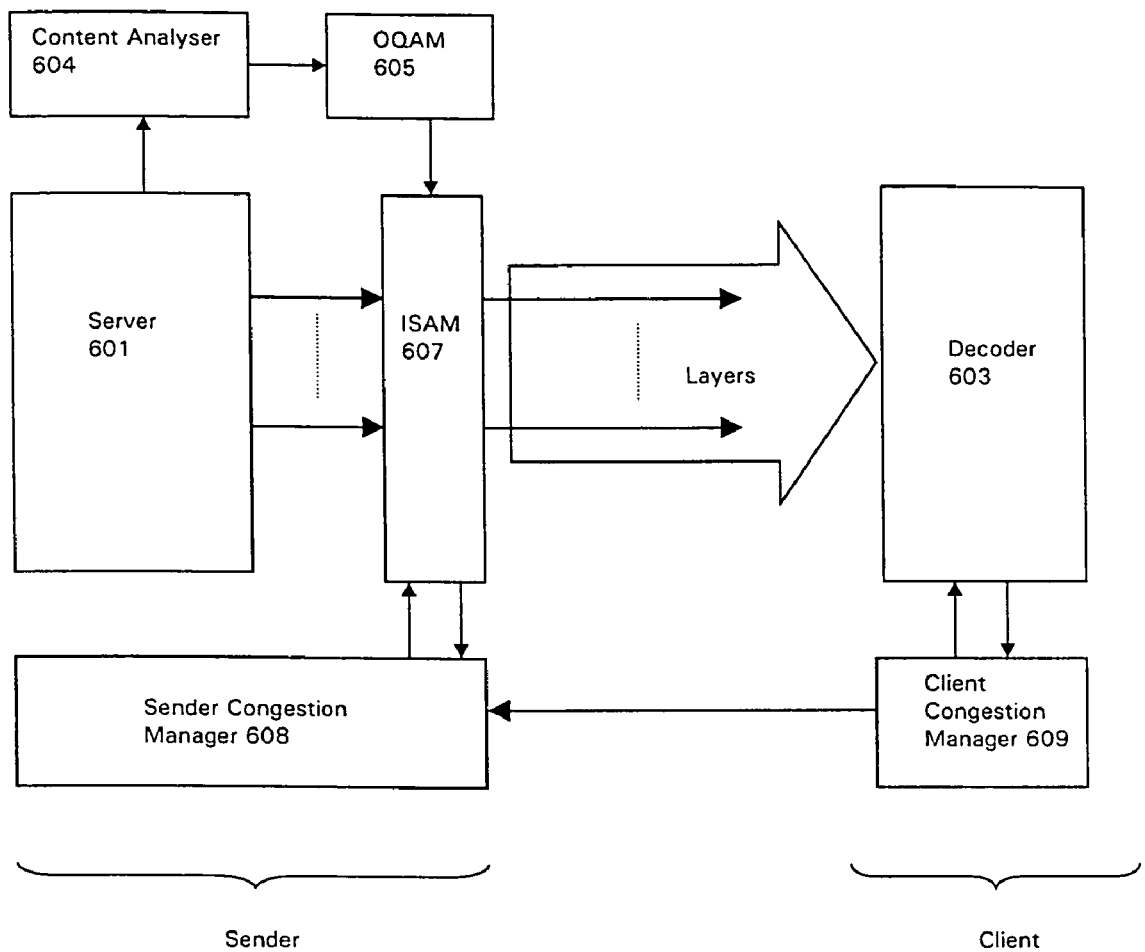
FIG. 6 is a diagram of a client according to a first embodiment of the present invention.

FIG. 6 illustrates a system which detects congestion in the network and also imposes the extra condition of adding or dropping a layer upon a scene change. The server 601 comprises the components of the media server 202 of FIG. 1 and the unit 603 comprises the components of the client 204 also shown in FIG. 1. Video data from the audiovisual source is also passed to a content analyser 604 which segments the video sequence into scenes. The segmented video is then passed to an objective quality assessment module (OQAM) 605 which assesses the contribution to the perceived quality of a scene that each component layer provides.

These results are then passed to an inter layer adaptation module (ILAM) 607. The function of the ILAM 607 is to continuously calculate the number of layers that maximise the perceived quality for the session. The ILAM 607 also receives input from a sender congestion manager 608 which reports on the bandwidth available to the session on the network 203. The sender congestion manager 608 receives feedback from a client congestion manager 609 on the number of packets that have been received. If this matches the number of packets that were sent then the bandwidth is known to be the current transmission rate. If packets are being lost then the bandwidth available to the session is less than the transmission rate, in which case the sender congestion manager 608 informs the ILAM 607 that a layer should be dropped.

In order to select which layer should be dropped the ILAM 607 couples the bandwidth required by a layer with its contribution to the quality of the complete image, as calculated by the OQAM 605. The ILAM 607 performs an exhaustive search on all of the bandwidth/quality values. When the ILAM 607 has selected which layer is to be dropped from a particular scene, the timing of the drop is preferentially set to coincide with the transmission of that particular scene. In this way the drop in quality occurs with the scene change and is thus much less noticeable to a viewer than if the quality change had occurred during a scene. In the case that no packets have been lost for a preset period of time the sender congestion manager 608 will request the ILAM 607 to add in a layer to test whether all of the available bandwidth is being employed. If no packets are lost during this experiment then the newly added layer is maintained. This process of experimentation with adding layers is continued until a significant proportion of packets are lost, in which instance the system can be confident that all of the available bandwidth is being employed. Again, the timing of the introduction of a layer is set to occur preferentially as the scene changes.

Under a given bit-rate allocation the levels of perceived quality do not change considerably within a scene, but scene cuts cause considerable changes in perceived quality, especially when the content features (spatial and motion energy) change a lot between subsequent scenes. As a consequence there will also be a significant difference in the corresponding quality scores for those successive scenes which may justify a rescheduling of the number of layers in the stream.

The invention is not limited in use to hierarchical encoding schemes. The invention is suitable for use in any encoding technique where the adaptation of transmission bit-rate to accommodate fluctuations in network capacity occurs. For instance the invention may be applied to a transcoding system where encoded data streams are transcoded from a high bit-rate to a low bit-rate or from a low bit-rate to a high bit-rate. The present invention would be suitable to reduce the impact for the viewer as the output bit-rate shifts in response to network conditions by timing the transition to occur upon a scene change in the encoded video sequence. Another example of an adaptive video streaming technique to which the invention may be applied is where multiple independent video streams of different bit-rates are transmitted. In this case the client chooses which stream to accept based on session bandwidth. The client may switch from one stream to another as bandwidth fluctuates; the present invention ensures that the switch is timed to coincide with a scene change in the encoded video stream.

Naturally, there may be times when a change of scene is such a long way away that it is advantageous to switch from one bit-rate to another other than during a change of scene. For example, consider the case where multiple independent video streams at different bit-rates are available for transmission by a media server to a client as, for example, described in co-pending European patent application No. 00310594.7 the contents of which are hereby incorporated herein by way of reference. In such a case, the server may be capable of transmitting a first stream at a bit-rate of 500 kbit/s and a second, higher quality stream at a bit-rate of 1500 kbit/s. The client may initially request that the server transmit the first stream at a transmission rate of 1000 kbit/s. If the network is not congested and all of the packets transmitted are successfully received by the client, the receive buffer at the client will start to fill with data at a rate of 500 kbit/s, since the client will only be removing data from the buffer at a rate of 500 kbit/s. After say 10 seconds of filling up the buffer at this rate, the client will have a buffer of ten seconds worth of data at which point it may decide it can attempt to receive the higher bit-rate second stream of video data from the server and thus sends an appropriate request to the server to this effect. If, however, the server is aware that the client has a receive buffer of 5 Mbytes size, it knows that it may continue sending data from the first stream at the rate of 1000 kbit/s for at least another 150 seconds before the receive buffer overflows, causing problems for the client. Therefore, the server may attempt to wait for a specified period to see if a scene change occurs during this interval. If so, a switch to the second higher bit-rate signal is not made until the change of scene occurs. Of course, if there is no change of scene within the determined period, the server switches to the higher rate anyway. In this example, a period of only ten seconds is deemed appropriate as the waiting time.

Note that instead of simply waiting to see if a change of scene occurs in the specified period and switching at the end of the period if no such change of scene is detected, an alternative method would be to pre-analyse the video to be sent (clearly this only applies to pre-stored video data and not live video) and to note when changes of scene occur. In such a case, the server, upon receipt of a request from the client to switch streams, could search to see if a suitable change of scene will occur within the predetermined period and if not to switch immediately to the new bit stream.

In the present example, upon switching to the higher rate bit stream, the client may have requested a transmission rate of 1500 kbit/s corresponding to the rate at which the data will be drawn from the receive buffer by the client. In such a case, the buffer size of 10 seconds should remain constant so long as all of the transmitted packets are successfully received by the client. However, in the event of congestion on the network, a proportion of packets may fail to arrive at the client. In such a case, the server will be warned of this via the RTCP. If the congestion is sufficiently severe, the server may deduce that the buffer is in danger of emptying which would cause a break in the video displayed by the client to occur. To prevent this, the server may switch back to the lower bit rate stream. Via the notification of how many packets are being lost, the server can deduce how long it will be before the buffer is emptied. For this time, the server can wait to see if a change of scene occurs, and if so, the new stream will be switched to at that point. Note that it would also be possible for the client to simply request that the new stream be switched to upon detecting that its receive buffer is emptying at an unsustainable rate.

Note that the amount of data in the buffer is actually of less significance than the rate of change of the amount of data in the buffer. Thus it is preferably this quantity which either the server or the client measures in order to determine whether to change from one bit stream to another (or whether to add or drop a layer in the first example).

What is claimed is:

1. A method of streaming multimedia from a multimedia server to a client, said method comprising:
   providing a stream of video data representing a video sequence to an output of the multimedia server for transmission to the client, wherein the output of the media server and an input to the client are connected to a packet based network;
   measuring a property of the video data in order to determine the occurrence of a scene change in the video sequence;
   detecting the available bandwidth on the network between the server and the client,
   selecting between multiple different possible streams of video data which encode the same video sequence at correspondingly differing bit rates and associated quality levels based on the detected available bandwidth on the network, the different possible streams comprising a current stream and one or more other streams,
   in the case that one of the one or more other streams is selected in preference to the current stream in response to a variation in the available bandwidth on the network, switching from the current stream to the selected one of the one or more other streams preferentially with a scene change in the video sequence, and
   providing the selected stream to the output of the multimedia server for transmission to the client, wherein
   the source of video data is encoded in real-time, and wherein
   upon detecting a change of the available bandwidth on the network between the server and client that is greater than a predetermined amount of bandwidth to cause a new stream of video data having a different bit rate to the current stream of video data to be selected for transmission, switching to the newly selected stream of video data only after the elapsement of a predetermined period of time, unless a change of scene is detected prior to elapsement of the predetermined period of time, in which case the stream of video data is switched from the current stream of video data to the newly selected stream of video data at the detected change of scene.

2. A method of streaming multimedia in accordance with claim 1, wherein
   upon detecting a decrease in the available bandwidth a new stream of video data is selected which has a lower bit rate than the current stream of video data.

3. A method of streaming multimedia in accordance with claim 1, wherein
   a new stream of video data having a greater bit rate than the current stream is periodically selected in order to ensure that all of the available bandwidth is being used.

4. A method of streaming multimedia in accordance with claim 1, wherein
   said streams of video data are comprised of differing combinations of a plurality of hierarchically encoded layers.

5. A method of streaming multimedia in accordance with claim 4, wherein
   a new stream of video data having a bit rate greater than or less than the bit-rate of the current stream of video data is generated by adding or dropping respectively one or more layers to or from the current stream of video data transferred to the output port.

6. A method of streaming multimedia in accordance with claim 5, wherein
   the objective quality contribution of each layer to the overall quality of the video sequence is measured in order to determine which of the layers is to be added or dropped from the stream of video data transferred to the output port.

7. A method of streaming multimedia in accordance with claim 1, wherein
   said streams of video data comprise a plurality of independently encoded flows each of which is encoded at different bit-rates.

8. A multimedia server comprising:
   a reader for reading video data representing a video sequence from a source;
   a scene change detector for detecting changes of scene in the video sequence;
   a detector for detecting available bandwidth between the multimedia server and a client on a packet network; and
   a video stream selector for selecting between multiple different possible streams of video data which encode the same video sequence at correspondingly differing bit rates and associated quality levels based on the detected available bandwidth on the network, the different possible streams comprising a current stream and one or more other streams,
   in the case that one of the one or more other streams is selected in preference to the current stream in response to a variation in the available bandwidth on the network, the video stream selector being arranged to switch from the current stream to the selected one of the one or more other streams preferentially with a scene change in the video sequence, the video stream selector
   providing the selected stream to an output of the multimedia server for transmission to the client via the packet network, wherein
   the source of video data is encoded in real-time, and wherein
   upon detecting a change of the available bandwidth on the network between the server and client that is greater than a predetermined amount of bandwidth to cause a new stream of video data having a different bit rate to the current stream of video data to be selected for transmission, switching to the newly selected stream of video data only after the elapsement of a predetermined period of time, unless a change of scene is detected prior to elapsement of the predetermined period of time, in which case the stream of video data is switched from the current stream of video data to the newly selected stream of video data at the detected change of scene.

9. A method of streaming multimedia from a multimedia server to a client, said method comprising:
   providing a stream of video data representing a video sequence to an output of the multimedia server for transmission to the client, wherein the output of the media server and an input to the client are connected to a packet based network;
   measuring a property of the video data in order to determine the occurrence of a scene change in the video sequence;
   detecting the available bandwidth on the network between the server and the client, selecting between multiple different possible streams of video data which encode the same video sequence at correspondingly differing bit rates and associated quality levels based on the detected available bandwidth on the network, the different possible streams comprising a current stream and one or more other streams, in the case that one of the one or more other streams is selected in preference to the current stream in response to a variation in the available bandwidth on the network, switching from the current stream to the selected one of the one or more other streams preferentially with a scene change in the video sequence, and providing the selected stream to the output of the multimedia server for transmission to the client, wherein the source of video data is stored in encoded form in a database, and wherein upon detecting a change of the available bandwidth on the network between the server and client that is greater than a predetermined amount of bandwidth to cause a new stream of video data having a different bit rate to the current stream of video data to be selected for transmission, the server determines if there is going to be a change of scene within a predetermined period of time, and if the server determines that there will be a change of scene within the predetermined period of time switching to the newly selected stream of video data at the detected change of scene, but if the server determines that there will not be a change of scene within the predetermined period of time, switching to the newly selected stream of video data substantially immediately after having made such a determination.

10. A method of streaming multimedia in accordance with claim 9, wherein
upon detecting a decrease in the available bandwidth a new stream of video data is selected which has a lower bit rate than the current stream of video data.

11. A method of streaming multimedia in accordance with claim 9, wherein a new stream of video data having a greater bit rate than the current stream is periodically selected in order to ensure that all of the available bandwidth is being used.

12. A method of streaming multimedia in accordance with claim 9, wherein
said streams of video data are comprised of differing combinations of a plurality of hierarchically encoded layers.

13. A method of streaming multimedia in accordance with claim 12, wherein
a new stream of video data having a bit rate greater than or less than the bit-rate of the current stream of video data is generated by adding or dropping respectively one or more layers to or from the current stream of video data transferred to the output port.

14. A method of streaming multimedia in accordance with claim 13, wherein
the objective quality contribution of each layer to the overall quality of the video sequence is measured in order to determine which of the layers is to be added or dropped from the stream of video data transferred to the output port.

15. A method of streaming multimedia in accordance with claim 9, wherein
said streams of video data comprise a plurality of independently encoded flows each of which is encoded at different bit-rates.

16. The method of claim 9, further including the step of,
prior to providing a stream of video data to the output of the media server, processing the video data to determine the positions within the video data in which changes of scene occur and making this information available to the server for permitting the determination of whether a scene change will occur within a predetermined period of time at any point along the video sequence.

17. A multimedia server comprising:
a reader for reading video data representing a video sequence from a source;
a scene change detector for detecting changes of scene in the video sequence;
a detector for detecting available bandwidth between the multimedia server and a client on a packet network; and
a video stream selector for selecting between multiple different possible streams of video data which encode the same video sequence at correspondingly differing bit rates and associated quality levels based on the detected available bandwidth on the network, the different possible streams comprising a current stream and one or more other streams,
in the case that one of the one or more other streams is selected in preference to the current stream in response to a variation in the available bandwidth on the network, the video stream selector being arranged to switch from the current stream to the selected one of the one or more other streams preferentially with a scene change in the video sequence, the video stream selector
providing the selected stream to an output of the multimedia server for transmission to the client via the packet network,
wherein the source of video data is stored in encoded form in a database, and
wherein upon detecting a change of the available bandwidth on the network between the server and client that is greater than a predetermined amount of bandwidth to cause a new stream of video data having a different bit rate to the current stream of video data to be selected for transmission, the server determines if there is going to be a change of scene within a predetermined period of time, and if the server determines that there will be a change of scene within the predetermined period of time switching to the newly selected stream of video data at the detected change of scene, but if the server determines that there will not be a change of scene within the predetermined period of time, switching to the newly selected stream of video data substantially immediately after having made such a determination.

* * * * *